(12) United States Patent
Roush

(10) Patent No.: US 9,555,841 B1
(45) Date of Patent: Jan. 31, 2017

(54) RETRACTABLE REAR FAIRING

(71) Applicant: Vanguard National Trailer Corporation, Monon, IN (US)

(72) Inventor: Mark Roush, Lafayette, IN (US)

(73) Assignee: Vanguard National Trailer Corporation, Monon, IN (US)

( * ) Notice: Subject to any disclaimer, the term of this patent is extended or adjusted under 35 U.S.C. 154(b) by 0 days.

(21) Appl. No.: 14/922,780

(22) Filed: Oct. 26, 2015

(51) Int. Cl.
  *B62D 35/00* (2006.01)

(52) U.S. Cl.
  CPC ........... *B62D 35/001* (2013.01); *B62D 35/007* (2013.01)

(58) Field of Classification Search
  CPC ...... B62D 35/00; B62D 35/001; B62D 35/007
  USPC ........ 296/180.1–180.5; 105/1.1, 1.3; 220/1.5
  See application file for complete search history.

(56) References Cited

U.S. PATENT DOCUMENTS

| | | | |
|---|---|---|---|
| 2,101,793 A | 12/1937 | Field | 280/423.1 |
| 3,960,402 A | 6/1976 | Keck | 296/180.4 |
| 4,214,787 A | 7/1980 | Chain | 296/180.4 |
| 4,257,641 A | 3/1981 | Keedy | 296/180.4 |
| 4,451,074 A | 5/1984 | Scanlon | 296/180.4 |
| 4,818,015 A | 4/1989 | Scanlon | 296/180.1 |
| 5,374,013 A | 12/1994 | Bassett | 244/130 |
| 5,823,610 A | 10/1998 | Ryan | 296/180.4 |
| 6,206,444 B1 | 3/2001 | Casey | 296/50 |
| 6,257,654 B1 | 7/2001 | Boivin | 296/180.5 |
| 6,309,010 B1 | 10/2001 | Whitten | 296/180.4 |
| 6,485,087 B1 | 11/2002 | Roberge | 296/180.5 |
| 6,666,498 B1 | 12/2003 | Whitten | 296/180.4 |
| 6,854,788 B1 | 2/2005 | Graham | 296/180.4 |
| 7,431,381 B2 | 10/2008 | Wood | 296/180.4 |
| 8,196,994 B2 | 6/2012 | Chen | 296/180.4 |
| 8,360,507 B2 | 1/2013 | Benton | 296/180.1 |
| 8,777,297 B2 | 7/2014 | Meredith | 296/180.4 |
| 8,851,554 B2 | 10/2014 | Wayburn | 296/180.4 |
| 2004/0119319 A1* | 6/2004 | Reiman | B62D 35/004 296/180.1 |
| 2008/0157560 A1 | 7/2008 | Spector | 296/180.4 |
| 2009/0026797 A1 | 1/2009 | Wood | 296/180.1 |
| 2013/0057020 A1 | 3/2013 | Burrell | 296/180.2 |
| 2013/0076064 A1 | 3/2013 | Smith | 296/180.1 |
| 2014/0292025 A1 | 10/2014 | Meredith | 296/180.4 |
| 2015/0008700 A1 | 1/2015 | Ryan | 296/180.1 |
| 2015/0008701 A1 | 1/2015 | Ryan | 296/180.1 |

(Continued)

*Primary Examiner* — Dannis H Pedder
(74) *Attorney, Agent, or Firm* — Niro McAndrews, LLC

(57) ABSTRACT

Disclosed are improved lightweight rear fairings that automatically retract when the rear doors of the trailer are opened. The fairings preferably each include rearwardly extending arms that stretch back from the hinged trailer doors to sheet rollers. The sheet rollers apply tension to fairing sheets that are secured to both the rollers and the sides of the trailer. The arms are able to rotate relative to the rear doors of the trailer, however rotation limiters restrict the amount that each of the arms may rotate towards the hinge of their respective door. Rotation of the arms away from the door hinges is not limited such that the arms may be rotated away from the hinges until they are flush with their respective doors. The fairing sheets are secured to the sides of the trailer at positions that are substantially forward of the rear doors such that even when the rear doors have been fully opened the rollers are still located rearward of the forward attachment points of the fairing sheets.

17 Claims, 17 Drawing Sheets

(56) References Cited

U.S. PATENT DOCUMENTS

2015/0035313 A1  2/2015  Wayburn .................. 296/180.4

* cited by examiner

RETRACTABLE REAR FAIRING

FIELD OF THE INVENTION

The present invention relates generally to an aerodynamic fairing for an over-the-road cargo container, and more particularly to a fairing that automatically retracts when the doors of the cargo container are opened.

BACKGROUND OF THE INVENTION

In 2004, the SmartWay Transport Partnership was created by several companies and the United States Environmental Protection Agency with the goal of advancing environmentally responsible logistics and transportation. In 2010, the California Air Resources Board program implemented rules requiring EPA SmartWay-approved fairings to be attached to trailers to reduce the aerodynamic drag on the trailers. Between 2010 and 2015, a dramatic increase in the number of trailers equipped with fairings has occurred with a corresponding increase in development and improvement of these fairings.

Two of the more common fairings that have been attached to over-the-road trailers are skirts secured to the underside of the trailer and rear drag reducers that extend from the back doors of the trailer. Each of these fairings present their own set of challenges. Being low to the road, the skirts are often damaged when the trailers pass over railroad tracks. The rear drag reducers are elevated away from the road and are less likely to be damaged from road debris, but the rear drag reducers increase the overall length of the trailer and must be disassembled, disengaged, or removed when the contents of the trailer are to be unloaded through the rear doors.

A Notable attempt that was made to solve some of the problems associated with trailer fairings includes the device disclosed in U.S. Pat. No. 7,431,381 issued to R. Wood that claims to cover "an improved method and device for the reduction of aerodynamic drag and for improved performance of bluff base vehicles by increasing the pressure on the bluff base of the vehicle by controlling the wake flow and the interaction of the wake flow with the vehicle bluff base region."

SUMMARY OF THE INVENTION

The present invention provides improved lightweight rear fairings that automatically retract when the rear doors of the trailer are opened. The fairings preferably each include rearwardly extending arms that stretch back from the hinged trailer doors to sheet rollers. The sheet rollers apply tension to fairing sheets that are secured to both the rollers and the sides of the trailer. The arms are able to rotate relative to the rear doors of the trailer, however rotation limiters restrict the amount that each of the arms may rotate towards the hinge of their respective door. Rotation of the arms away from the door hinges is not limited such that the arms may be rotated away from the hinges until they are flush with their respective doors. The fairing sheets are secured to the sides of the trailer at positions that are substantially forward of the rear doors such that even when the rear doors have been fully opened the rollers are still located rearward of the forward attachment points of the fairing sheets.

DETAILED DESCRIPTION

Figure 1:
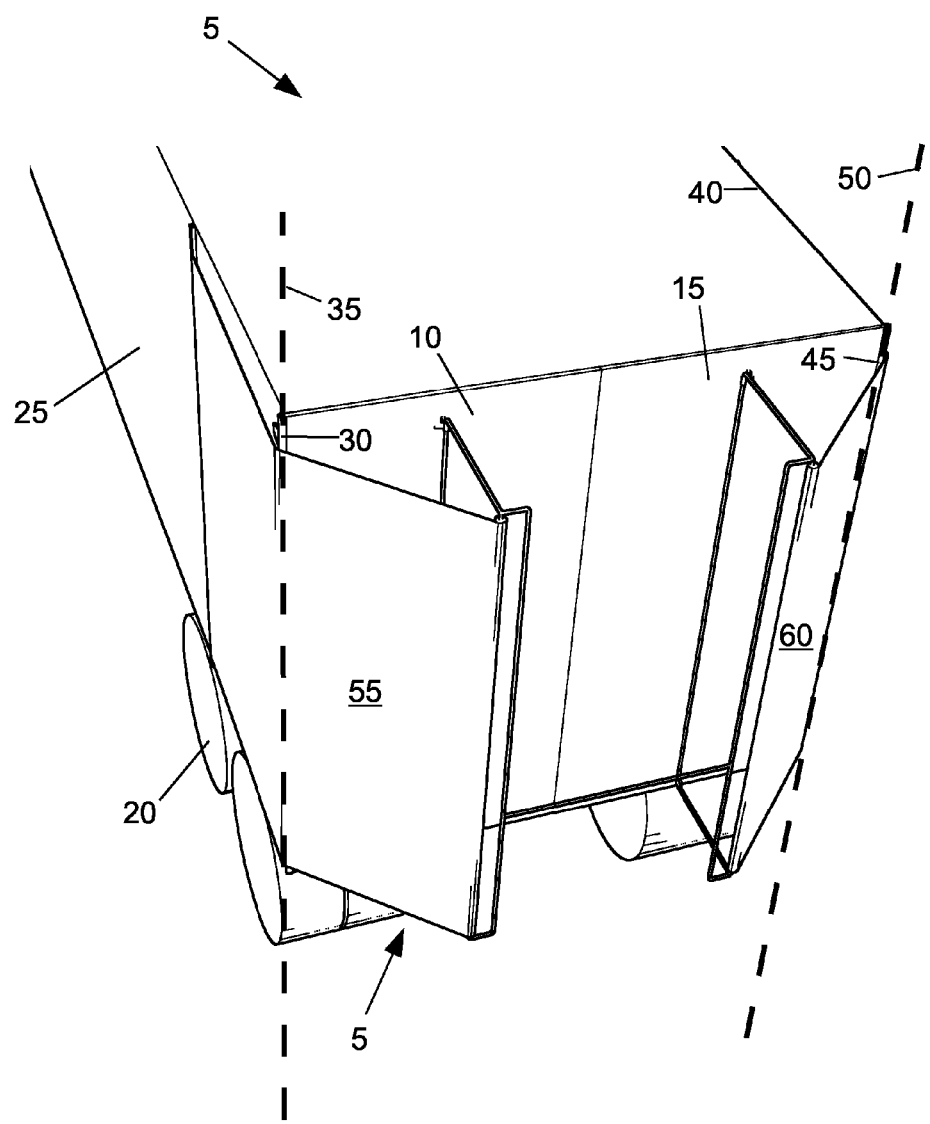
FIG. 1 shows a rear perspective view of two retractable fairings for reducing the parasitic drag of an over-the-road trailer.

The present invention may be used with any type of cargo container that experiences drag and is particularly suited for containers that travel at high speeds and are frequently loaded and unloaded. However, for descriptive purposes the present invention will be described in use with over-the-road trailers.

FIGS. 1 through 4 show an over the road trailer 5 with a left door 10 and a right door 15 above a wheel assembly 20. The left door 10 is secured to the left side 25 of the trailer 10 via a left hinge 30 that rotates about a left vertical axis of rotation 35. The right door 15 is secured to the right side 40 of the trailer 5 by a right hinge 45 that rotates about a right vertical axis of rotation 50. A left fairing system 55 is secured to both the left side 25 of the trailer 5 and the left door 10 while a right fairing system 60 is secured to the right door 15 and the right side 40 of the trailer 5. In an exemplary embodiment, the left and right fairing systems (55 and 60) are symmetrical about a centerline 65 that bisects the trailer 5 and generally passes through the intersection of the left door 10 and the right door 15.

In the illustrated examples, each of the fairing systems (55 and 60) includes a C-shaped bar 70 with an upper bar 75 secured to the roller top on the fairing system, a lower bar 80 secured to roller tops on the fairing systems, and a vertical bar 85 that extends between the upper and lower bars (75 and 80). Horizontally extending from the vertical bars is a horizontal bar 90 that connects to the horizontal bar 90 of the other fairing system. The C-shaped bars help to stabilize the fairing system by reducing the amount of rotational torque that is exerted upon the doors of the trailer. In an exemplary embodiment, a locking system is used to secure the horizontal bars together when the fairings are in use such that the fairing system adds an additional layer of security for the contents of the over-the-road trailer.

Figure 5:
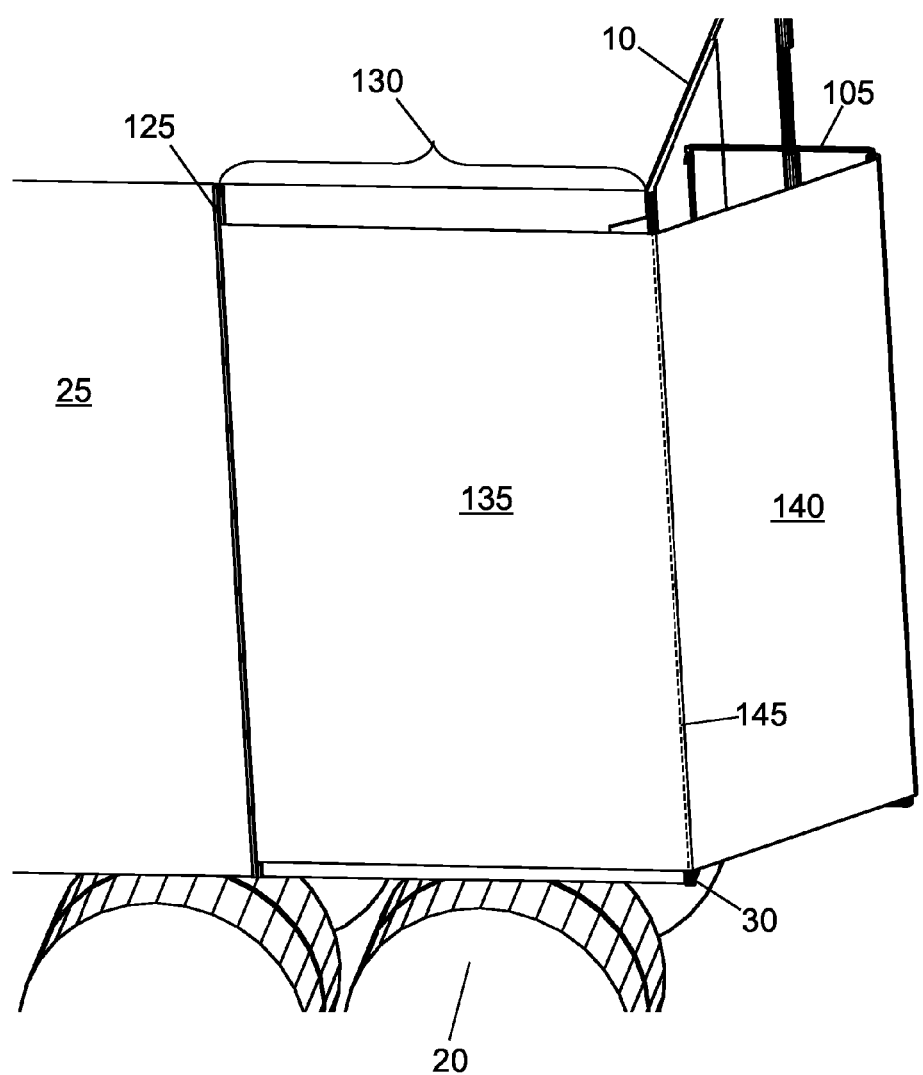
FIG. 5 shows a side perspective view of a single retractable fairing fully deployed and secured to the rear of an over-the-road travel trailer.
Figure 6:
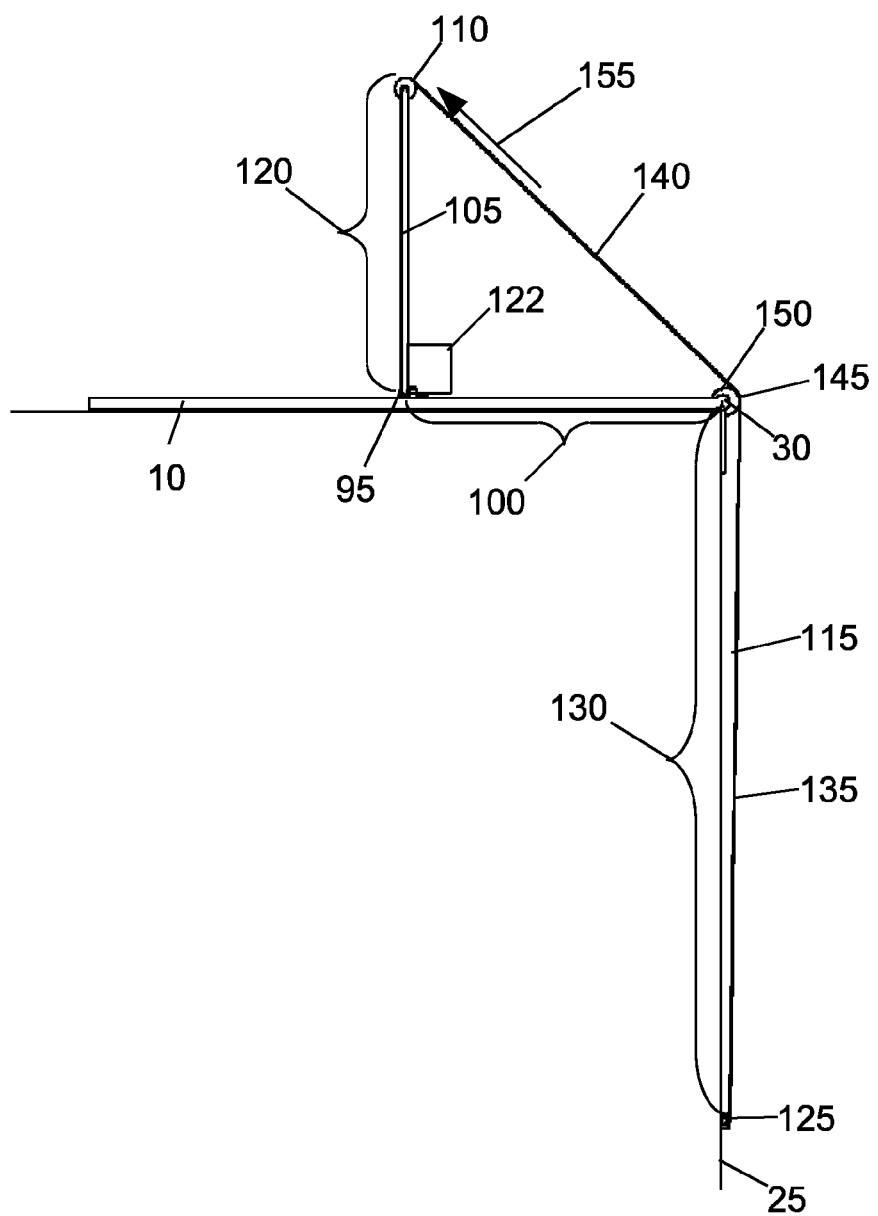
FIG. 6 shows a top perspective view of a single retractable fairing fully deployed and secured to the rear of an over-the-road travel trailer.

FIGS. 5 and 6 illustrate the left fairing system 55 in detail. While not shown, it should be appreciated that the right fairing system 60 has similar features that mirror those of the left fairing system. Securing the left fairing system 55 to the left door 10 is a rotation mechanism 95 that includes an upper rotor and a lower rotor that are shown in more detail in FIGS. 18 through 20. The rotation mechanism 95 is spaced a first distance 100 from the left vertical axis of rotation 35 that is surrounded by the left hinge 30. Extending away from the rotation mechanism 95 on the left door 10 is a rotation arm 105. At the distal end of the rotation arm 105 is a sheet tensioner 110 or roller that acts to pull on a first end of a fairing sheet 115. The rotation arm 105 and sheet tensioner 110 extend back from the left door 10 a second distance 120. In the illustrated example, the rotation arm 105 and the portion of the left door 10 between the rotation mechanism 95 and the left hinge 30 forms an angle, 122 that is a right angle. As explained in more detail in other portions of the specification, a rotation limiter blocks the rotation of the arm such that the angle 122 may be a right angle or an obtuse angle, but not an acute angle.

120 that is a right angle. As explained in more detail in other portions of the specification, a rotation limiter blocks the rotation of the arm such that the angle 120 may be a right angle or an obtuse angle, but not an acute angle.

The rearward most end of the fairing sheet 115 is secured to the sheet tensioner 110 that acts to pull the rearward most end of the sheet towards the forward most end of the sheet. As the door transitions from a fully closed orientation (shown in FIG. 6) to a fully open orientation (shown in FIGS. 15 and 16) the amount of fairing sheet 115 between the two ends decreases and the sheet tensioner 110 acts to take up the slack sheet such that the fairing sheet 115 remains taught as it is deployed or retracted.

At the forward most end of the fairing sheet 115 is a mount 125 that is secured to the left side 25 of the trailer. In the illustrated embodiment, the mount 125 is a vertically oriented track with a C-shape that is configured to secure a bulbous front end of the fairing sheet 115. In an exemplary embodiment, the vertically oriented track has a selectively openable bottom end that allows a user to feed the bulbous end of the fairing sheet up the track and then close the opening when the bulbous end is fully secured within the track. In the illustrated example, the track of the mount 125 fully extends from the top of the cargo container to the bottom of the cargo container, however it should be appreciated that multiple spaced-apart tracks may be utilized as a single mount and still be within the scope of the invention.

The mount 125 is located a third distance 130 from the left hinge 30 that surrounds the left vertical axis of rotation 35. In the illustrated example, the sum of the first distance 100 plus the second distance 120 is less than the third distance 130. As the doors of the trailer are opened, the three distances do not change however the spatial relationship between the three distances does change.

In the fully deployed configuration that occurs when the doors of the trailer are closed, the fairing sheet 115 includes two primary planar surfaces, the forward primary planar surface 135 and the rearward primary planar surface 140 are joined by an intermediary surface 145 that is adjacent to the left hinge 30. As can be seen in FIG. 5, the intermediary surface 145 of the fairing sheet is adjacent to substantially all of the left hinge 30. In other words, in the fully deployed configuration, the left hinge 30 is almost fully covered by the fairing sheet 115. As illustrated in FIG. 6, substantially all of the forward primary planar surface is located adjacent to the left side 25 of the container, the intermediary surface 145 of the fairing sheet 115 is located adjacent to the left hinge axis, and a portion of the fairing sheet 115 is wound around the sheet tensioner 110.

The rearward primary planar surface 140 acts to turn the abrupt 90 degree edge of the door into a smoother transition that guides air towards the back of the trailer. As the trailer is moving at high speeds, a low air pressure zone is created behind the rear doors which creates a parasitic drag on the trailer and reduces the overall fuel efficiency of the tractor trailer combination. With the addition of the rearward primary planar surface 140, the air is directed into the region of low pressure that forms behind the trailer and the parasitic drag experienced by the tractor trailer combination is decreased. While the aerodynamic impact of the forward primary surface 135 is not as significant as the rearward primary planar surface 140, the forward primary planar surface 135 creates a smooth side surface and a smooth transition to the rearward primary surface 140, both of which contribute to the overall aerodynamic characteristics of the trailer.

Figure 12:
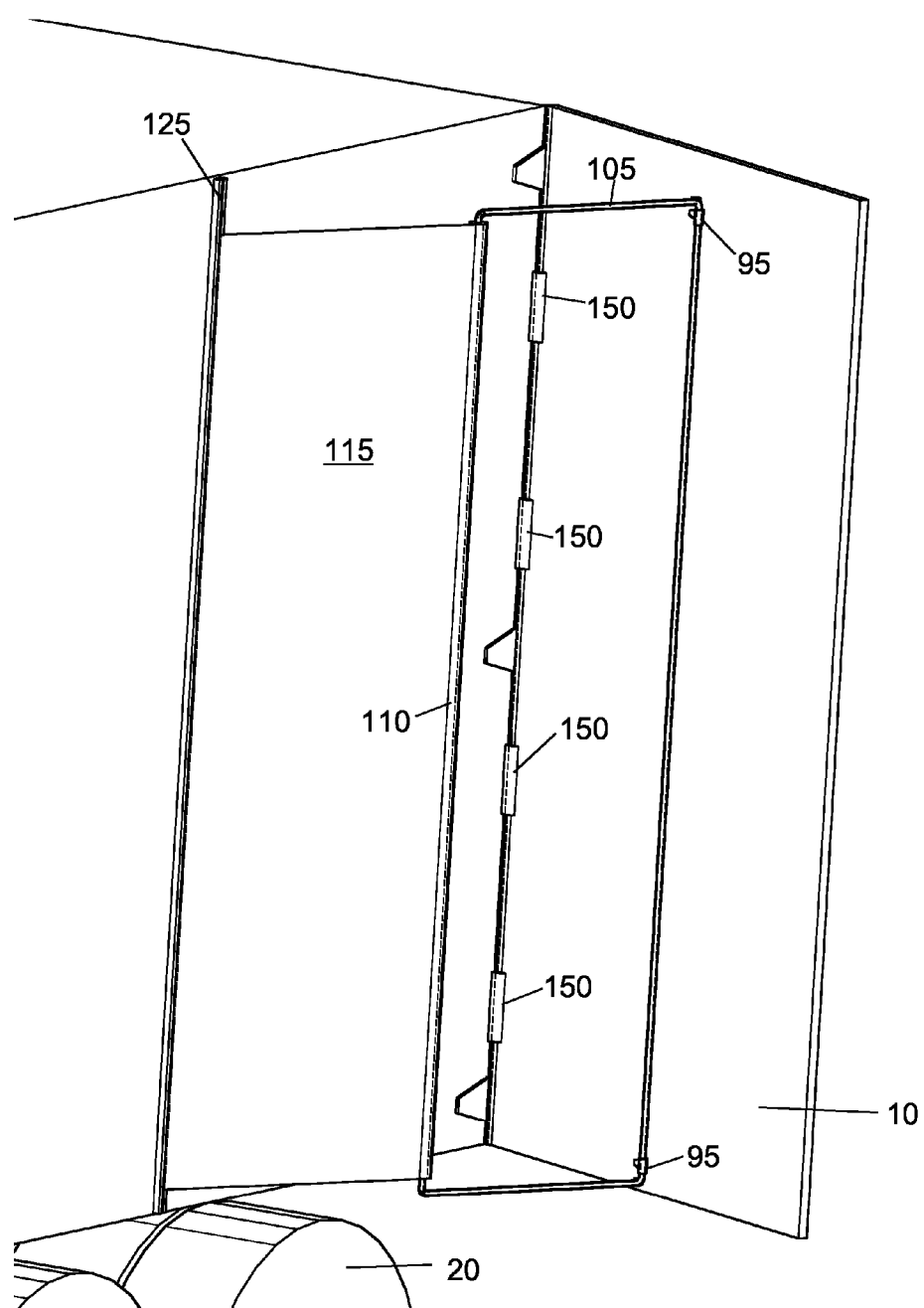
FIG. 12 shows a side perspective view of a retractable fairing system on an opening door wherein the fairing system has a rotor arm beginning to rotate away from the hinge of the opening door.
Figure 20:
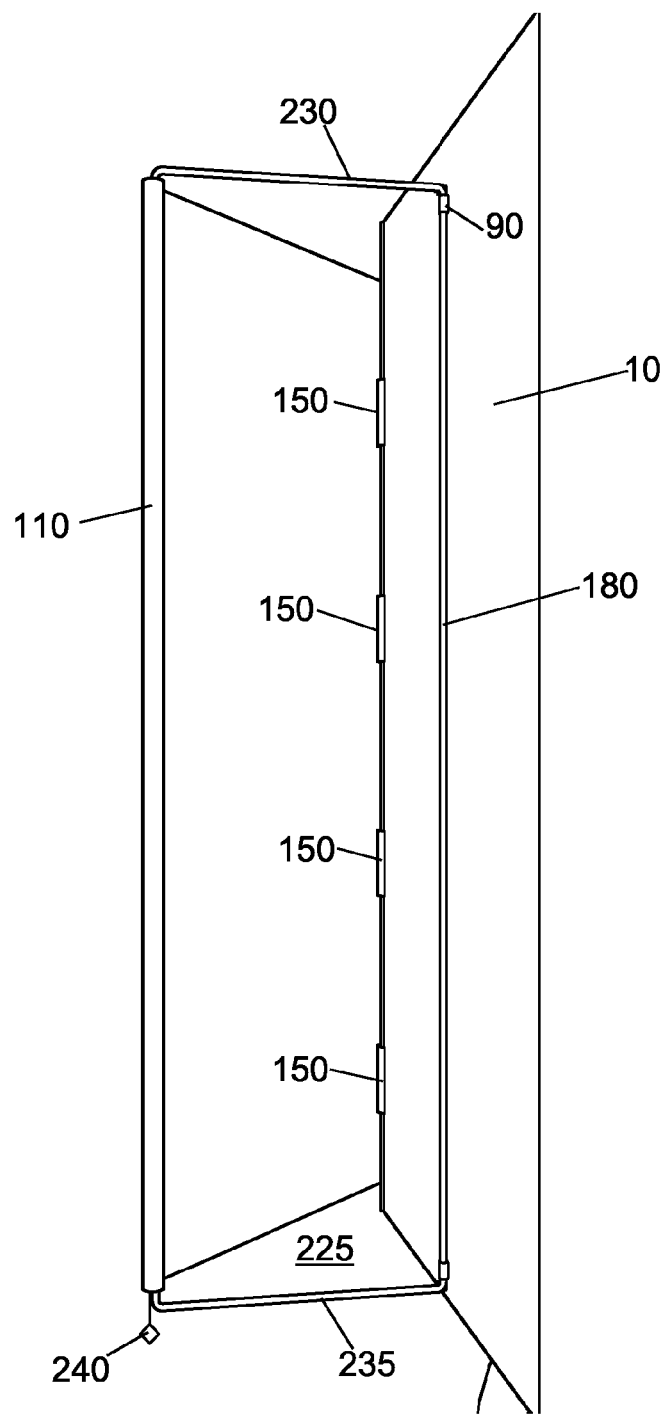
FIG. 20 is a side view of a roller secured to a trailer door via a rotation arm and rotation mechanism.

As can be seen in FIG. 6 as well as FIGS. 12 and 20, in the illustrated example there are snag reducers 150 that surround the left vertical axis of rotation and slightly offset the fairing sheet 115 from the left hinge 30. The snag reducers 150 act to provide a slight gap between the fairing sheet 115 and the left hinge 30 such that when the fairing sheet flexes or moves it will not rub against or snag upon the left hinge 30. In an exemplary embodiment, the snag reducers are constructed of polytetrafluoroethylene such that the surfaces are resistant to being coated by road grime that could act as an abrasive upon the fairing sheet 115.

Figure 7:
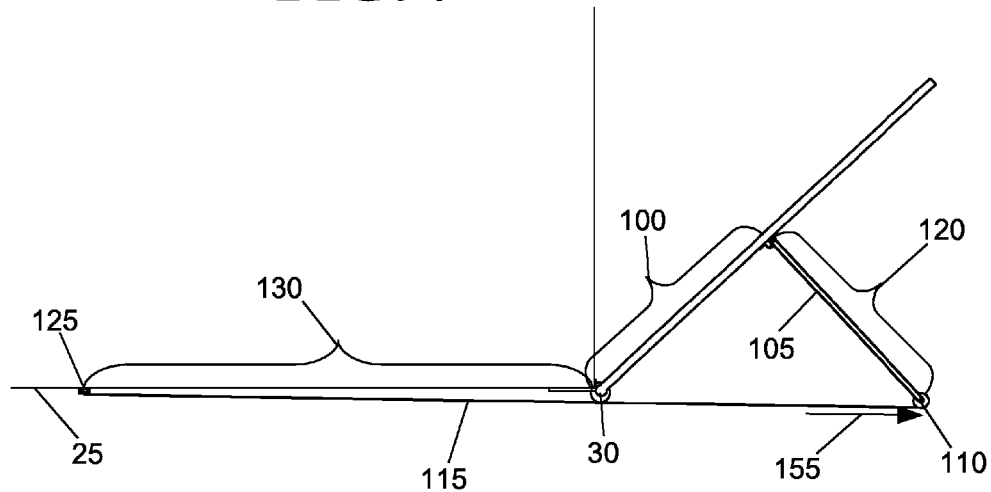
FIG. 7 shows a top view of a partially retracted fairing secured to the rear door of an over-the-road trailer.
Figure 8:
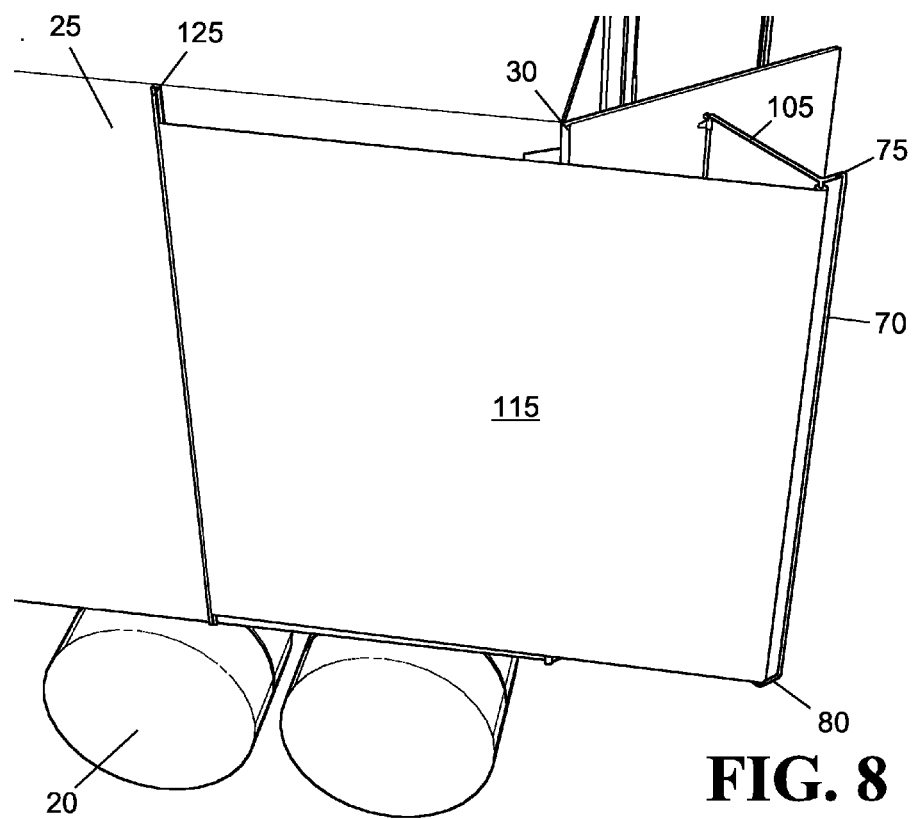
FIG. 8 shows a side perspective view of a partially retracted fairing secured to the rear door of an over-the-road trailer.

FIGS. 7 and 8 illustrate an example of a fairing system on a door that has been opened a sufficient amount such that the forward primary planar surface 135 and the rearward primary planar surface 140 have become a single planar surface as the fairing sheet 115 is no longer bent around the snag reducers 150 and/or the left hinge 30. As the door is opened past the configuration shown in FIGS. 7 and 8, the left fairing system 55 begins to exert an opening torque on the left hinge 30 such that the left door 10 will automatically open without further interaction from the operator of the trailer. In FIGS. 7 and 8 (as well as in FIGS. 5 and 6), the sheet tensioner 110 is pulling the fairing sheet almost directly away 155 from the left hinge 30/left vertical axis of rotation 35. As a result of the direction of the exerted force, there is practically no rotational torque exerted by the left fairing system 55 in FIGS. 5 through 8. As the door is opened past the configuration shown in FIGS. 7 and 8, the rotational torque exerted on the left hinge 30 is increased such that the trailer door may open automatically without further intervention of the operator of the trailer. The exact amount the door must be opened for automatic continued opening to occur will depend on several factors that include the pulling strength of the sheet tensioner 110, the length of the first distance 100 and the second distance 120, the internal friction of the left hinge 30, and the orientation of the trailer. For example, it will be more difficult for the left fairing system to fully open the left rear door of a tractor trailer that is parked facing up a steep hill compared to a the left door of a tractor trailer that is parked on flat ground.

Figure 2:
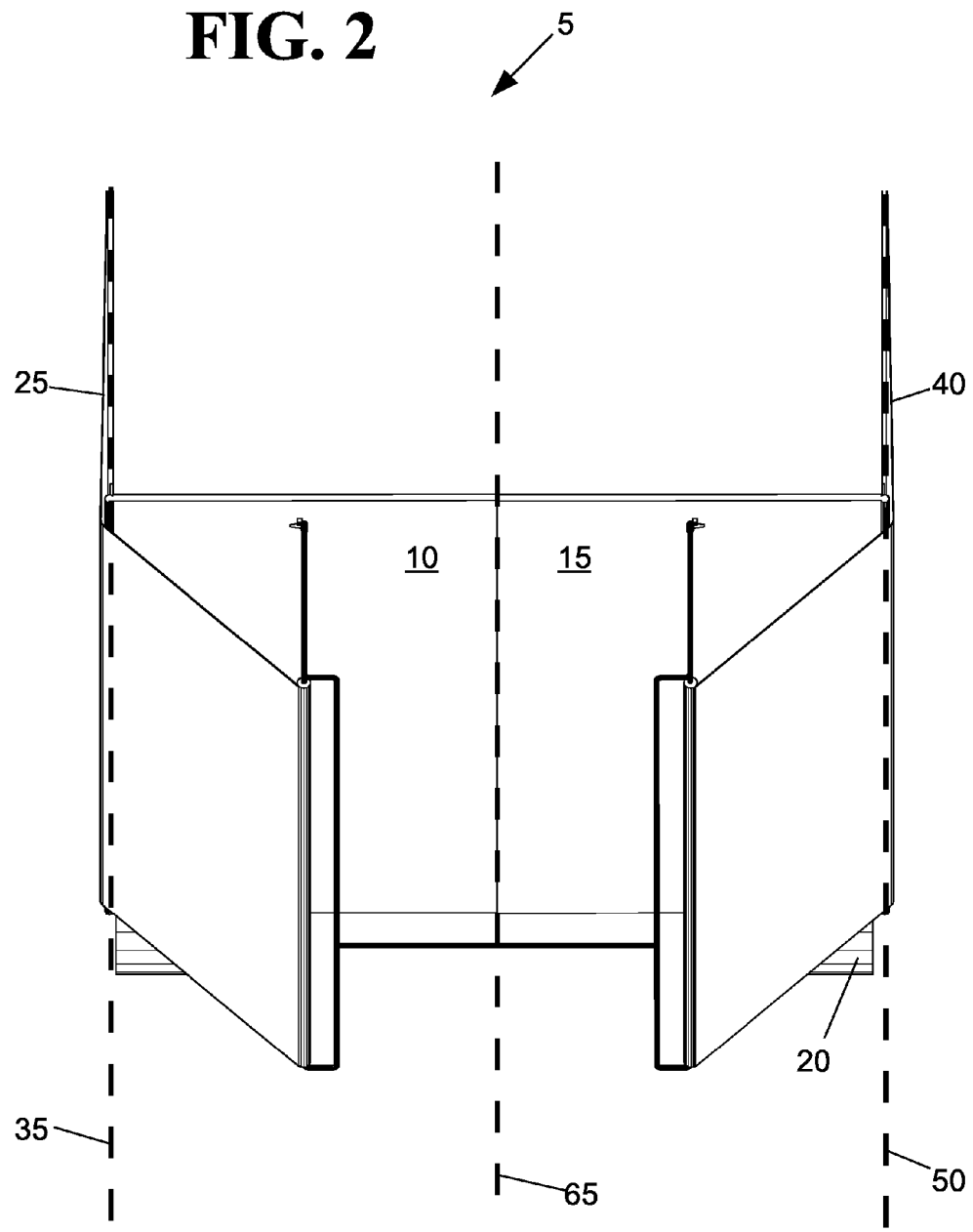
FIG. 2 shows an upper rear perspective view of two retractable fairings fully deployed and secured to the rear of an over-the-road travel trailer.
Figure 3:
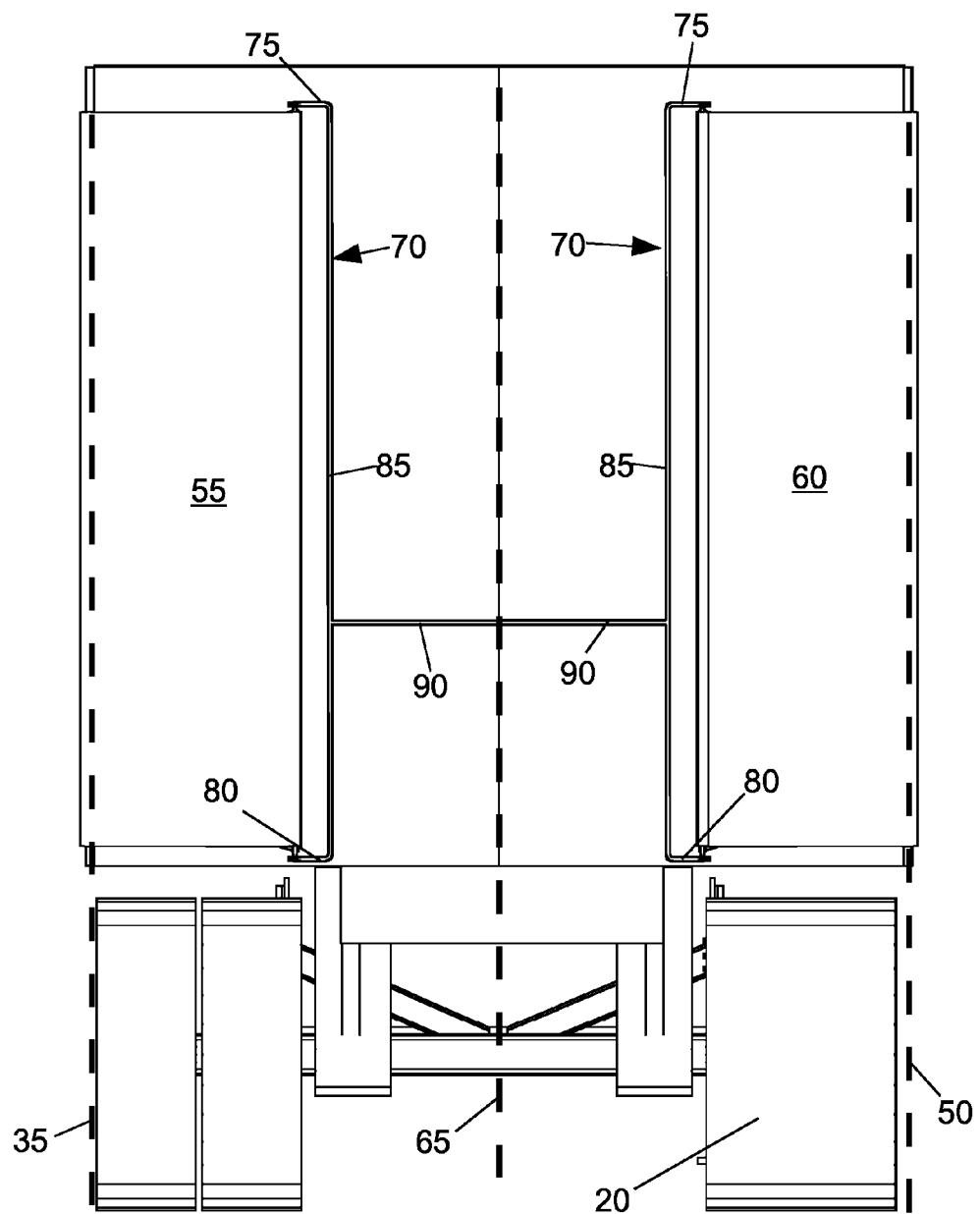
FIG. 3 shows an upper rear view of two retractable fairings fully deployed and secured to the rear of an over-the-road travel trailer.
Figure 4:
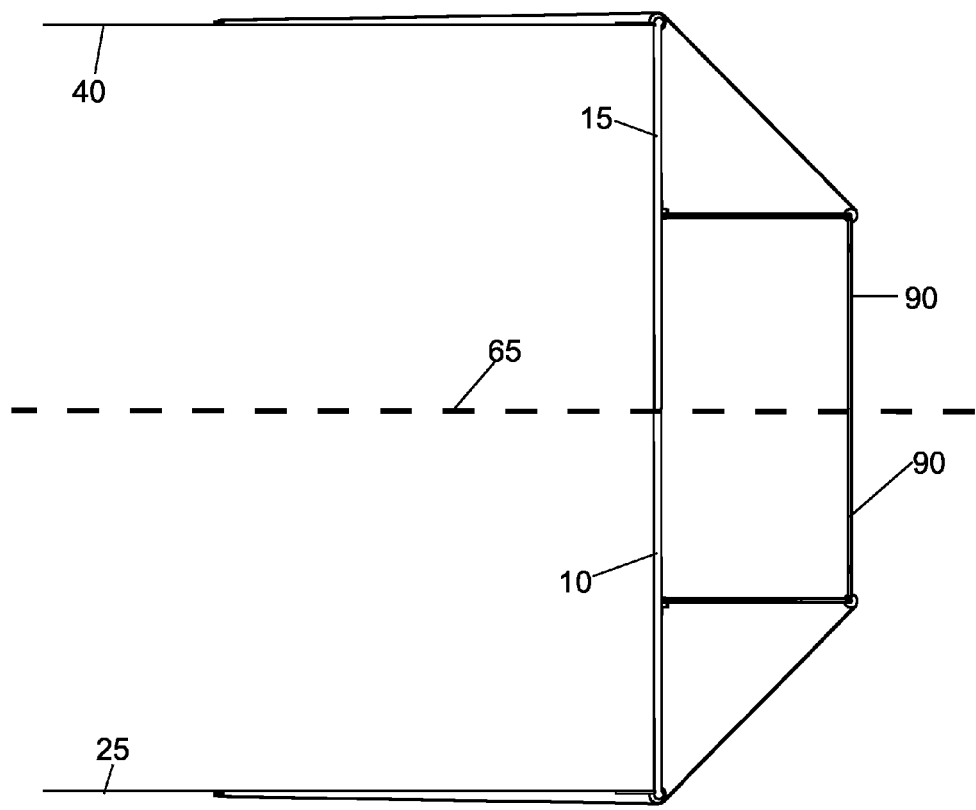
FIG. 4 shows a top view of two retractable fairings fully deployed and secured to the rear of an over-the-road travel trailer.

While the left fairing system 55 does not exert a substantial torque on the left hinge 30 in the examples shown in FIGS. 5 through 8, the pulling by the sheet tensioner 110 does exert a torque upon the rotation mechanism 95 that is proportional to the second distance 120. To counteract this torque, in an exemplary embodiment, the sheet tensioners 110 include C-shaped bars 70, highlighted in FIGS. 1-3 and 8, which balance the pulling forces of the sheet tensioners. In FIGS. 1-3, the two C-shaped bars 70 are connected to each other through horizontal bars 90, however in FIG. 8 the horizontal bar 90 has been rotated downward such that it is fully adjacent to the vertical bar 85. The C-shaped bars 70 may also be allowed to rotate relative to the sheet tensioners 110 such that they do not limit the amount that the doors may be opened. For example, if an exemplary C-shaped bar was shown in FIG. 15, it would have rotated to be located primarily between the mount 125 and the sheet tensioner 110 instead of between the sheet tensioner 110 and the left door 10.

Figure 9:
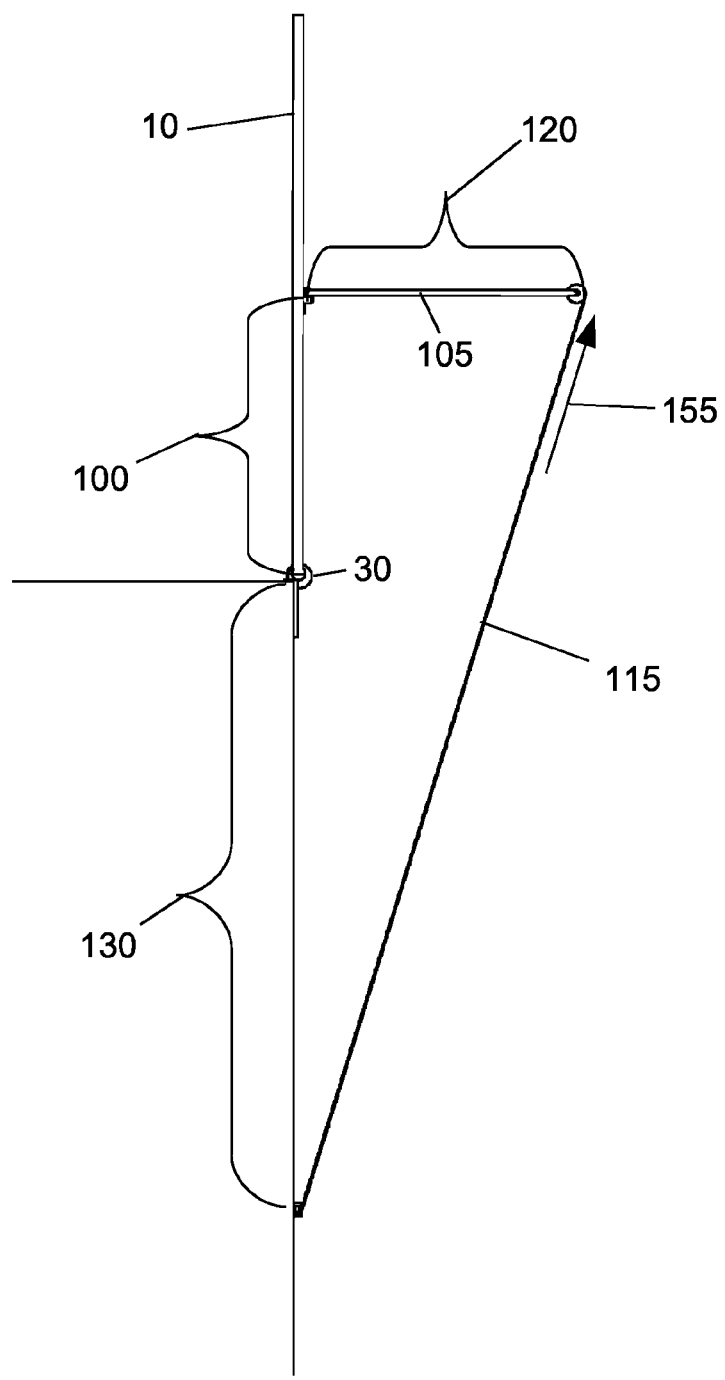
FIG. 9 shows a top view of a retractable fairing secured to a rear trailer door that has been opened 90 degrees.
Figure 10:
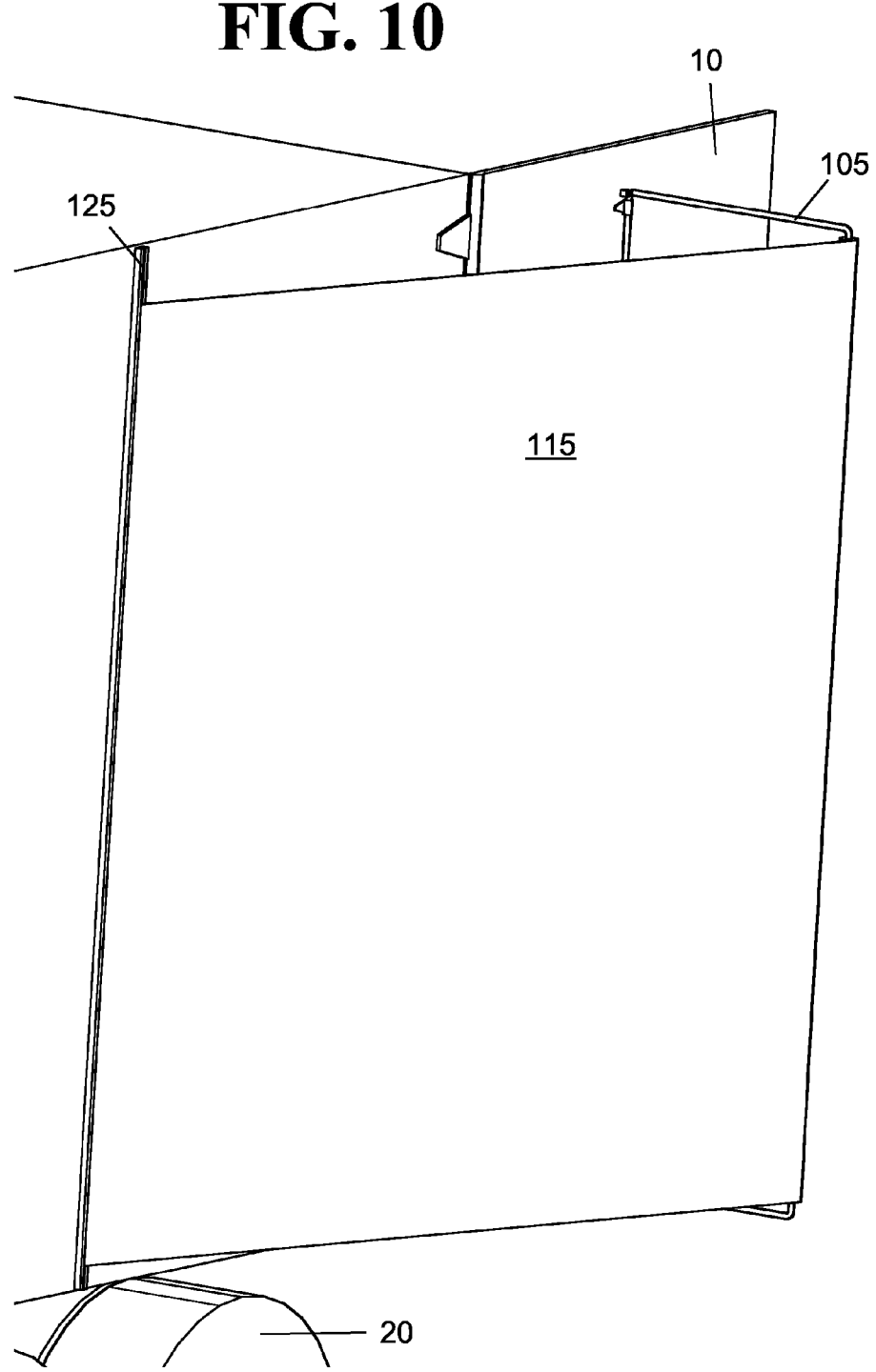
FIG. 10 shows a side perspective view of a retractable fairing secured to a rear trailer door that has been opened 90 degrees.

FIGS. 9 and 10 show the left fairing system 55 where the left door 10 has been opened 90 degrees relative to a fully closed position. In the illustrated example, the sheet tensioner 110 is no longer pulling the sheet in a direction 155 directly away from the left hinge 30 so an opening torque is applied to the left hinge 30 that acts to automatically pull the left door 10 into the fully opened position shown in FIGS. 15 through 18. While the rotational torque may not be as high as in FIGS. 11 and 12 where the sheet tensioner is pulling orthogonal to the left vertical axis of rotation, in an exemplary embodiment the rotational torque exerted on the configuration shown in FIGS. 9 and 10 is sufficient to automatically open the door.

Figure 11:
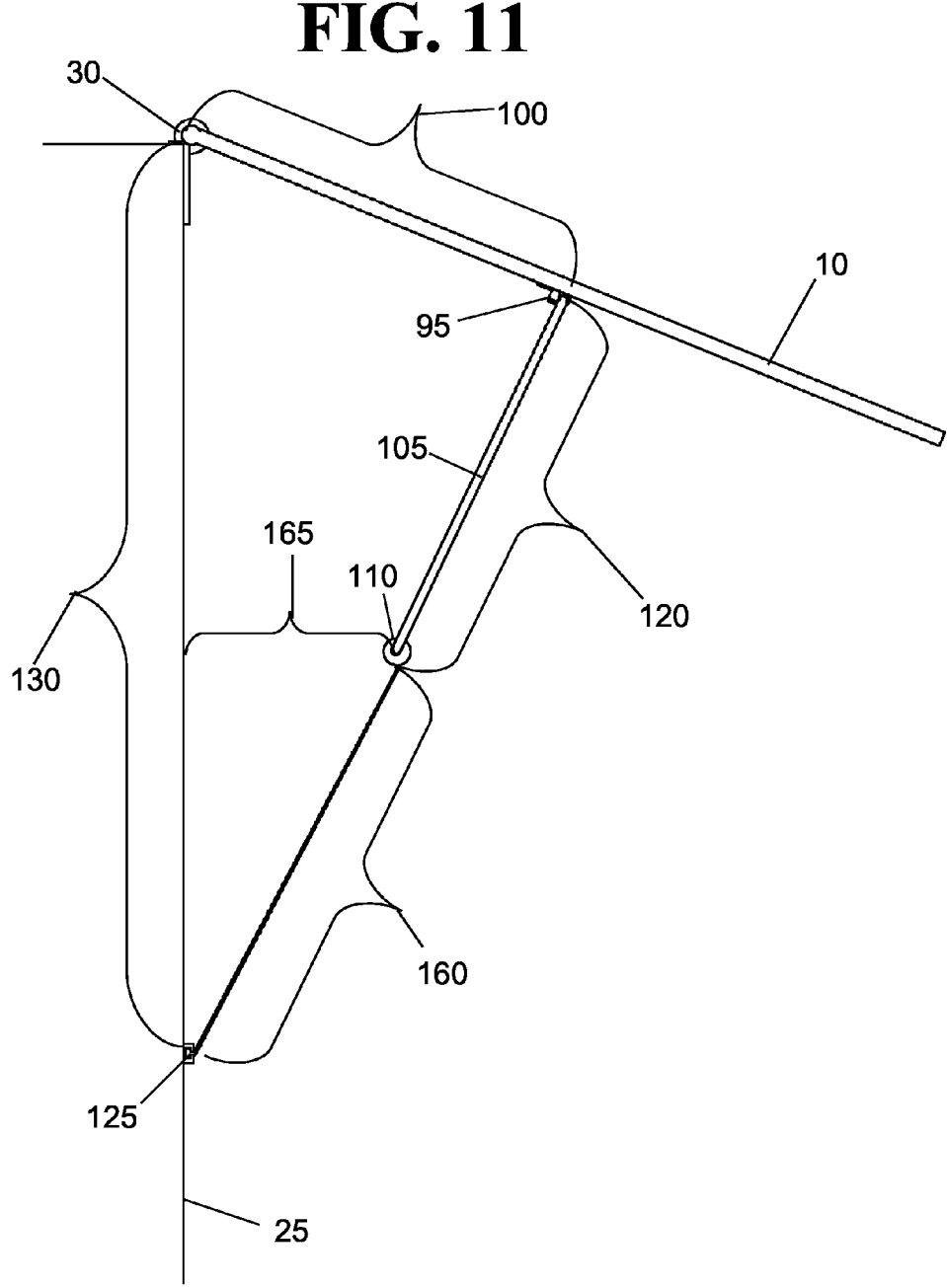
FIG. 11 shows a top view of a retractable fairing system on an opening door wherein the fairing system has a rotor arm beginning to rotate away from the hinge of the opening door.

FIGS. 11 and 12 illustrate the moment in the rotation of the left door 10 when the rotation arm 105 begins to rotate about the rotation mechanism 95 away from the left hinge 30 or left vertical axis of rotation 35. In FIGS. 5 through 10 the sheet tensioner 110 has been at a changing location, but at a constant distance from the left hinge 30/left vertical axis of rotation 35. Starting at FIGS. 11 and 12 in the opening process, the sheet tensioner 110 begins to increase its separation from the left hinge 30. In the illustrated example, there is a sheet length 160 between the sheet tensioner 110 and the mount 125 when the rotation arm 105 begins to rotate about the rotation mechanism 105. The relationship between the sheet length 160 and door rotation at the moment the rotation arm 105 begins to rotate away from the left vertical axis can be represented as:

$$S_L = \sqrt{D_4^2 - D_2^2} - D_1$$

wherein $S_L$ is the sheet length 160, $D_4$ is the third distance 130, $D_2$ is the first distance 100, and $D_1$ is the second distance 120. As highlighted in FIG. 11, the sheet tensioner 110 is located a substantial distance 165 from the left side 25 of the trailer 5 when the rotation arm 105 begins to rotate away from the left vertical axis of rotation 35. FIG. 12 also highlights the series of snag reducers 150 that are secured about the left hinge 30 to protect the fairing sheet 115 from snags and tears. The slightly larger diameter of the snag reducers 115 relative to the left hinge 30 can be seen in the figure. In an exemplary embodiment, each of the snag reducers 150 circumscribes the left vertical axis of rotatation 35 and are able to freely rotate about the axis such that they act like bearings for the fairing sheet 115.

Figure 13:
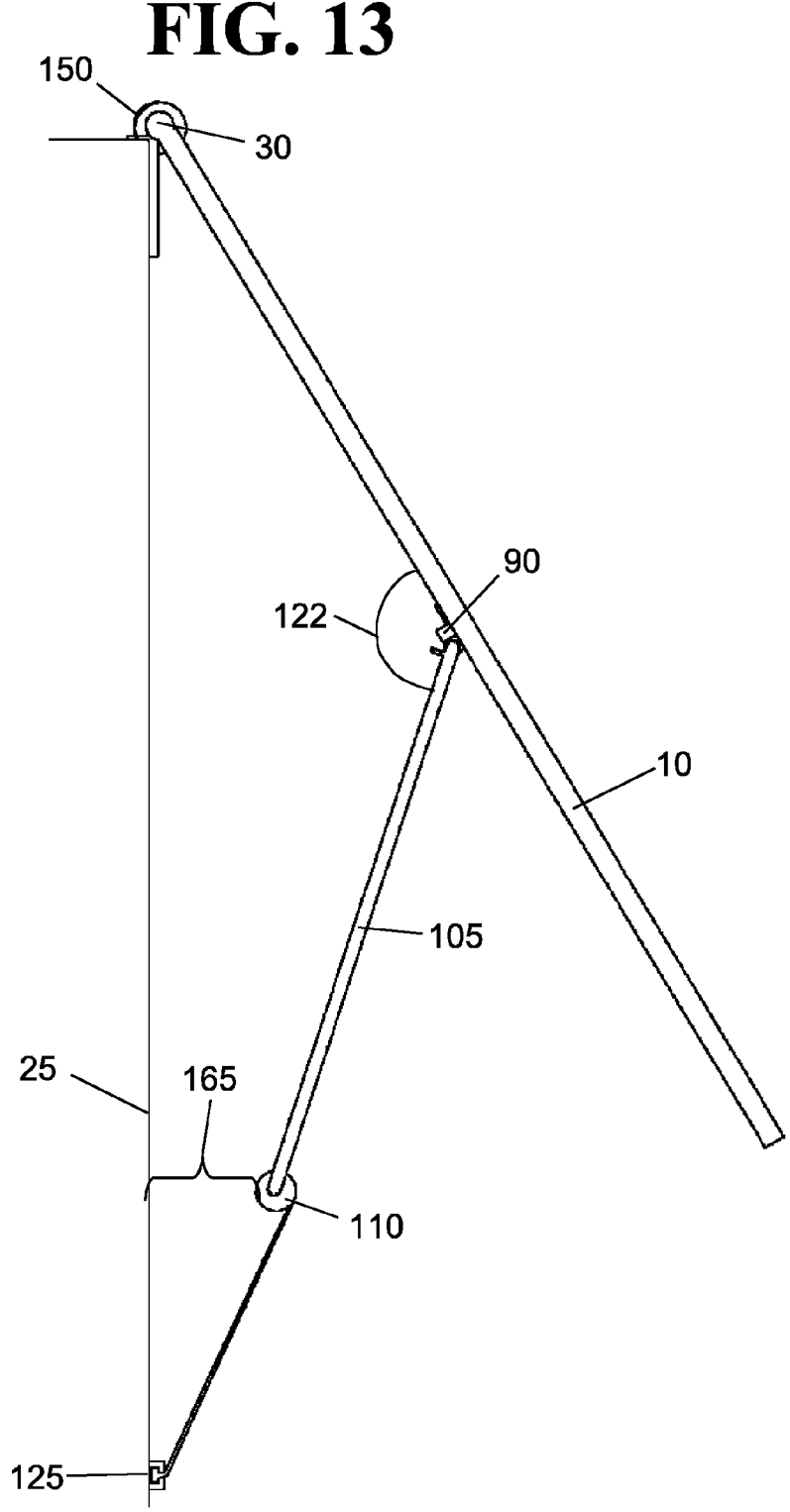
FIG. 13 shows a top view of a retractable fairing system on an opening door wherein the fairing system has a rotor arm that has rotated away from the hinge of the door, but is not yet adjacent to the side wall of the trailer.
Figure 14:
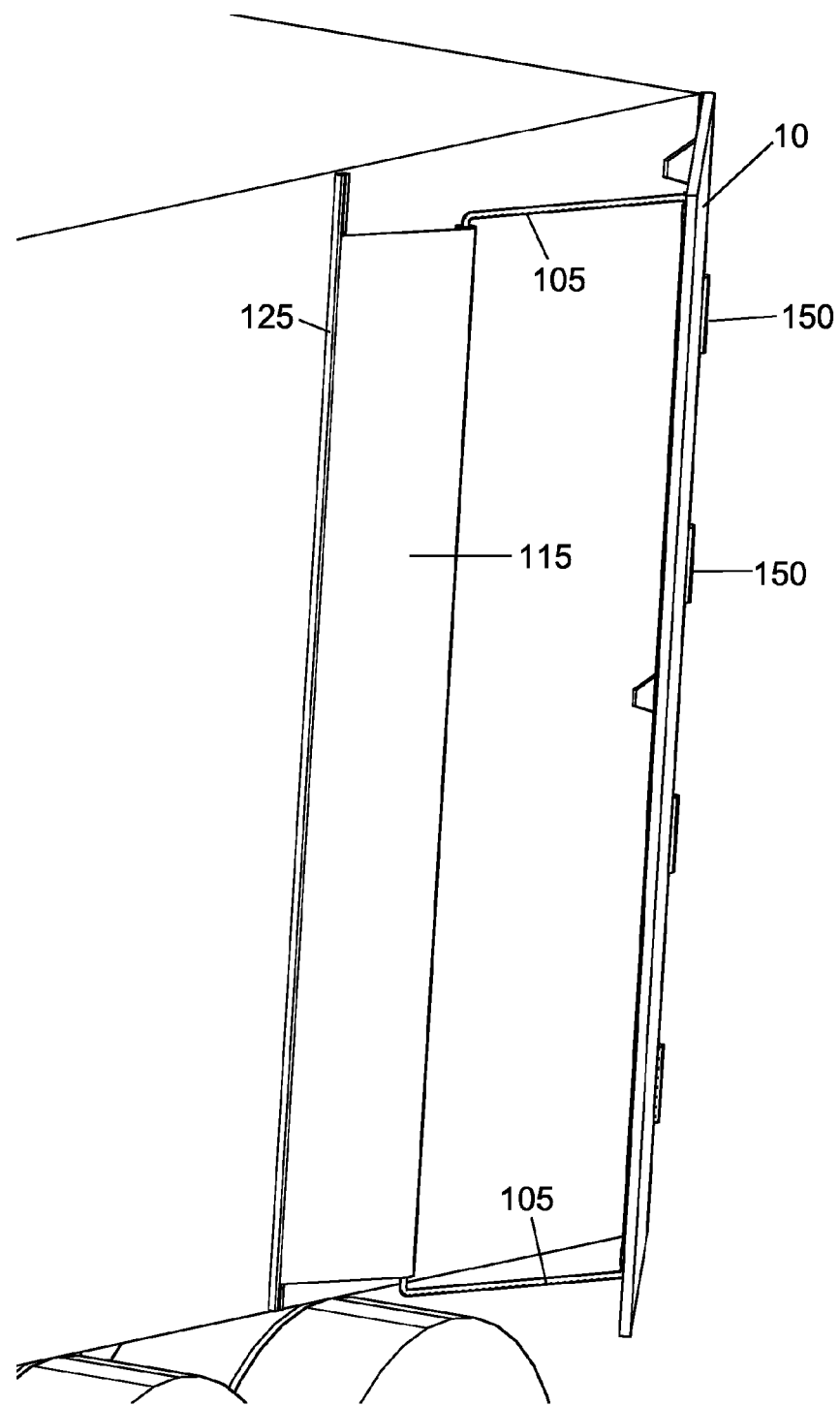
FIG. 14 shows a perspective view of a retractable fairing system on an opening door wherein the fairing system has a rotor arm that has rotated away from the hinge of the door, but is not yet adjacent to the side wall of the trailer.

FIGS. 13 and 14 illustrate a door that has almost been fully opened. As highlighted in FIG. 13, the angle 122 that was a right angle in FIG. 6 has become an obtuse angle. The sheet tensioner 110 has increased its distance from the left hinge 30. While the substantial distance 165 shown in FIG. 11 has been decreased, there is still separation between the left side 25 of the trailer and the sheet tensioner 110.

Figure 15:
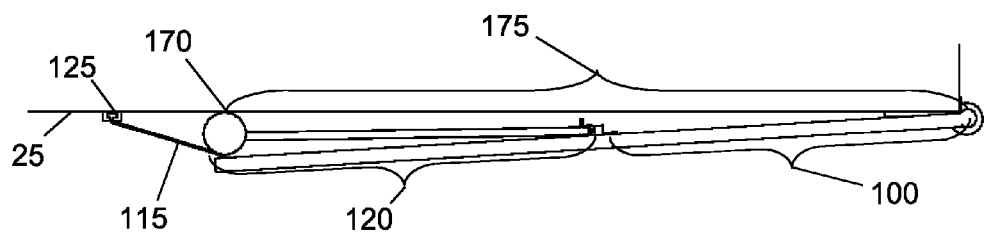
FIG. 15 is a top view of a retractable fairing system secured to a trailer door that has been fully opened.
Figure 16:
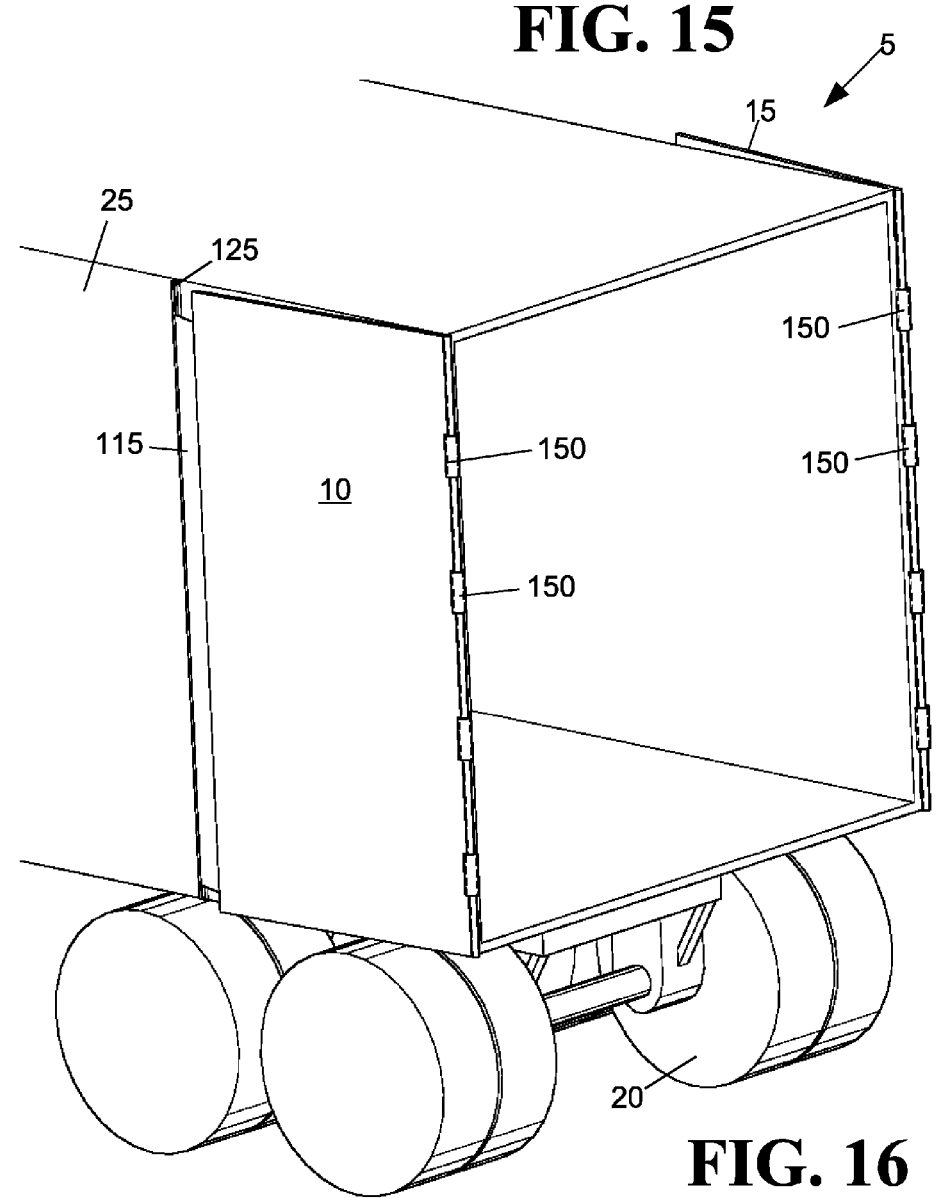
FIG. 16 is a rear perspective view of a retractable fairing system secured to a trailer door that has been fully opened.
Figure 17:
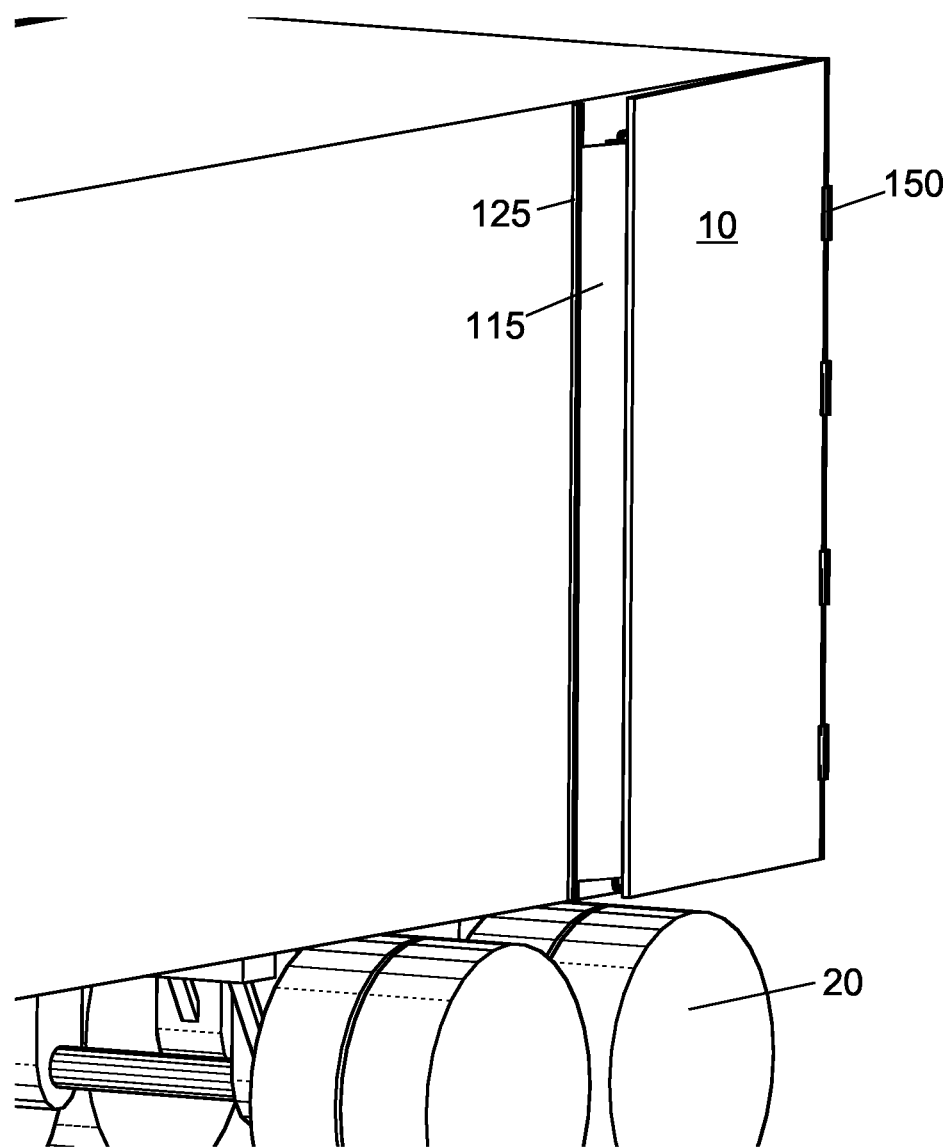
FIG. 17 is a front perspective view of a retractable fairing system secured to a trailer door that has been fully opened.

FIGS. 15 through 17 show doors that are in a fully opened configuration with fully retracted fairing systems. In FIG. 15, the sheet tensioner 110 is pressed against the left side 25 of the trailer at a first point of contact 170 that is located a fourth distance 175 from the left vertical axis of rotation 35. In the illustrated example, the square root of the first distance 100 squared plus the second distance 120 squared is substantially less than the length of the third distance 175. If the rotor arm 105 had not rotated away from the left vertical axis of rotation 35, the square root of the first distance 100 squared plus the second distance 120 squared would have been substantially equal to the length of the third distance 175. It should be appreciated that in some embodiments the left side of the trailer will include thin wear plates configured to contact the sheet tensioner 110. The applicant herein defines the thin wear plates to be part of the left side 25 with regards to determining the first point of contact for the left side 25. FIG. 15 also highlights how the first point of contact 170 is located between, and distant from, both the left hinge 30 and the mount 125 that secures the forward end of the fairing sheet 115.

While the various fairing configurations have been discussed in detail with regards to the process that occurs when the trailer door is opened, the process of deploying the fairing is simply the reverse process of retracting the fairing with the exception of the retractable fairing not automatically closing the trailer door after a certain stage of the process has been reached. Like the door opening process where the fairing automatically retracts when the door was opened, the deployment of the rear fairing occurs automatically when a user closes the trailer doors.

Figure 18:
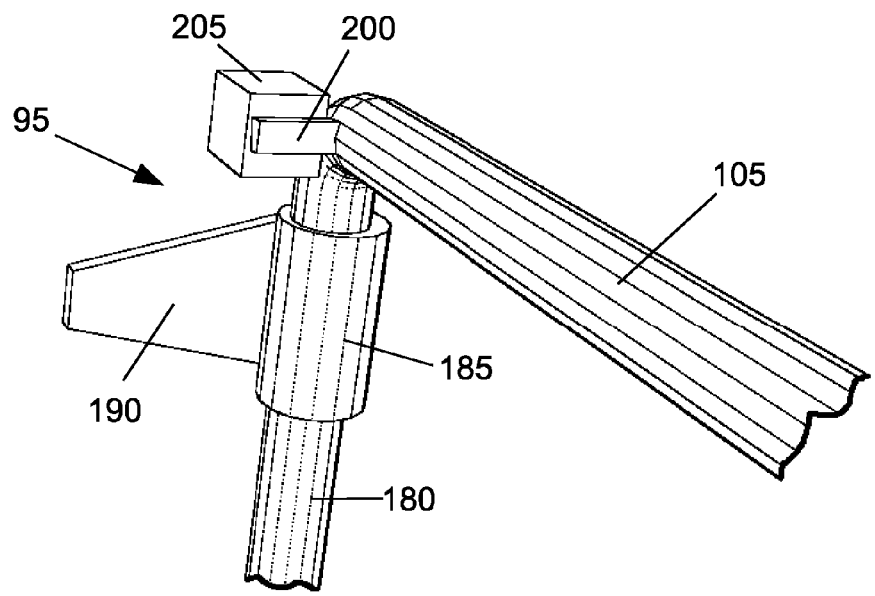
FIG. 18 is a close-up perspective view of a rotation arm secured to a trailer door with a rotation mechanism wherein a rotation limiter restricts how far the rotation arm may rotate towards the hinge of the trailer door.
Figure 19:
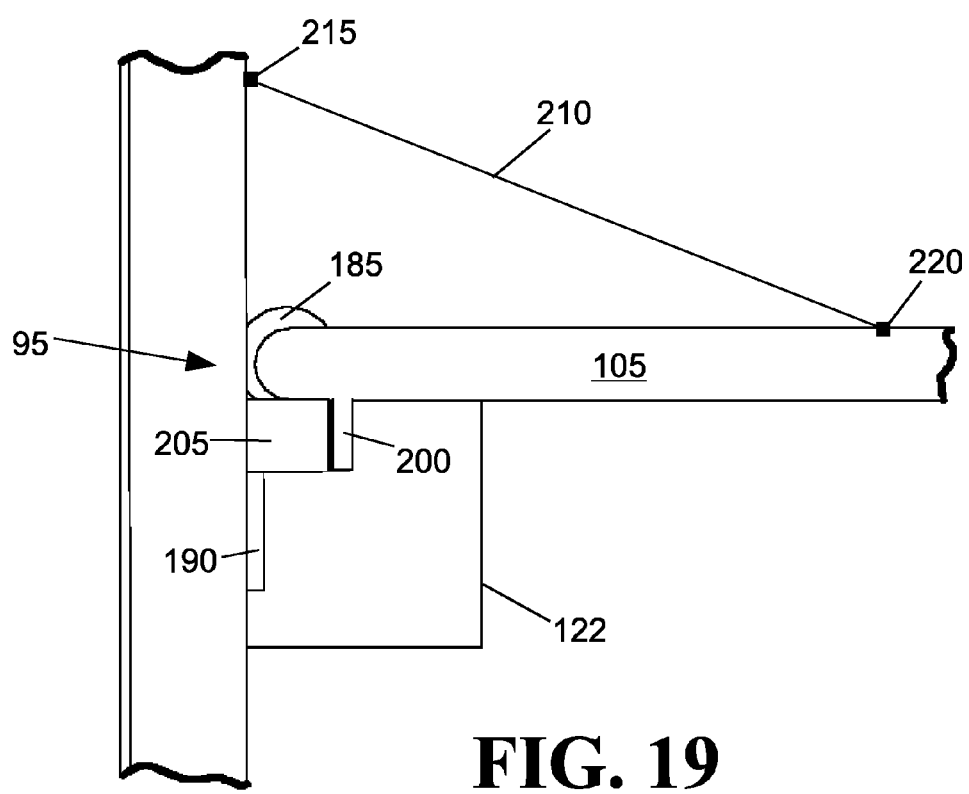
FIG. 19 is a close-up top view of a rotation arm secured to a trailer door with a rotation mechanism wherein a rotation limiter restricts how far the rotation arm may rotate towards the hinge of the trailer door.

FIGS. 18 and 19 show detailed illustrations of the rotation mechanism 95 and the rotation arm 105 near the left door 10. In the illustrated example, the rotation mechanism includes a vertical cylinder 180 that passes through a tube 185 secured to the left door via a fastener 190. The tube 185 is constructed to allow the rotation arm 105 to rotate on a horizontal geometric plane while maintaining the same elevation. In the illustrated example, the vertical cylinder 180 is formed as a continuous construction with the rotation arm, however it should be appreciated that in other embodiments the components of the rotation mechanism 95 will be completely distinct from the components of the rotation arm 105. A rotation mechanism 95 is shown that limits the rotation of the arm 105 towards the left hinge. The rotation limiter includes a protrusion 200 that extends horizontally from the vertical cylinder 180. A block 205 is positioned such that when the rotation arm 105 rotates to a right angle 122 relative to the left door 10, the protrusion 200 contacts the block 205 and prevents further rotation of the arm 105. In the illustrated example, a rotation limiter 195 is shown as a distinct feature from the rest of the rotation mechanism 95, but the inventor contemplates single piece rotation mechanisms. For example, instead of utilizing a separate block, the protrusion of the vertical cylinder could be configured to travel a specific path in the tube 185 that limits the rotation of the arm. FIG. 19 illustrates yet another type of a rotation limiter where a length of wire 210 is stretched from a first point 215 on the left door 10 to a second point 220 on the rotation arm 105. The length of wire is configured such that when the wire 210 is taught, the rotation arm 105 will be at the desired maximum rotation relative to the left door 10.

FIG. 20 shows the structure of the left fairing system when the fairing is fully deployed on a fully closed door. The fairing system includes a large air gap 225 that is substantially bounded by the sheet tensioner 110 or sheet roller, an upper rotation arm 230, a lower rotation arm 235, and the left door 10. Since the vertical tube 180 is directly adjacent to the left door 10, the large air gap 225 is still substantially bounded by the left door even if the air gap does not fully extend to the left door 10. FIG. 20 also shows the sheet tensioner 110 or roller equipped with an auxiliary ratcheting tensioning device 240. The ratcheting tension device 240 is configured to allow a trailer operator to rotate the sheet tensioner thereby increasing the amount of tension on the fairing sheet 115. While the fairing sheet is preferably constructed of a resilient material that is resistant to stretching and road grime, it is expected that over time the fairing sheet 115 may stretch a small amount thus decreasing the tension of the fairing sheet 115. The ratcheting tension device 240 allows a trailer user to take up that additional slack in the fairing sheet 115.

Another feature contemplated by the inventor is the ability to temporarily disengage the rotation limiter 95. For intermodal trailers that are carried by both over-the-road tractors as well as trains, it is desirable to be able to temporarily and easily disengage the rotation limiters 95 so when carried by a train multiple trailers may be closely packed end-to-end. In one example, the wire 210 that extends between a first point 215 on the left door 10 and the second point 220 on the rotation arm is disconnectable from the door, the rotation arm, or both to allow the rotation arm to fully rotate towards the left hinge 30. In another example, the protrusion 200 and block 205 of the rotation limiter 95 are removable or moveable to a location where they do not prevent the arm from rotating towards the door hinge of the trailer.

The inventor contemplates several alterations and improvements to the disclosed invention. Other alterations, variations, and combinations are possible that fall within the scope of the present invention. Although various embodiments of the present invention have been described, those skilled in the art will recognize more modifications that may be made that would nonetheless fall within the scope of the present invention. Therefore, the present invention should not be limited to the specific examples described.

I claim:

1. An apparatus for reducing the aerodynamic drag of a container with a right side, a left side, and a rear side having
 a right door connecting to the right side via a right hinge that rotates about a right hinge axis,
 a left door connecting to the left side via a left hinge that rotates about a left hinge axis, and
 a centerline between the right door and the left door,
the apparatus comprising a
 a first fairing system with
  a first roller
   tensioning a first sheet secured to the left side of the container via a first mount and
   having a first rear point a first distance from the left door,
  a first rotor mechanism
   secured to the left door and
   separated from the left hinge axis by a second distance,
  a first rotation limiter configured to restrict rotation of a first rotation arm towards the left hinge axis,
  the first rotation arm extending from the first rotor mechanism to the first roller,
wherein during opening rotation of the left door about the left hinge axis
 the first roller is configured to retract the first sheet and
 the first rotation arm is configured to rotate away from the left hinge axis before the first roller is adjacent to the left side of the container.

2. The apparatus of claim 1 wherein
during opening rotation of the left door
 the first roller is configured to contact the left side at a first point of contact, wherein
 first point of contact is a third distance from the left hinge axis; and
a square root of the sum of the first distance squared plus the second distance squared
 is substantially less than
 the third distance.

3. The apparatus of claim 2 wherein
the first point of contact is located distant from the left hinge axis and between the left hinge axis and the first mount.

4. The apparatus of claim 1 wherein
during opening rotation of the left door the first rotation arm is configured to begin to rotate away from the left hinge axis when $$S_L = \sqrt{D_4^2 - D_2^2} - D_1$$

wherein
 $S_L$ is a total length of the first sheet extending from the first roller to the first mount,
 $D_4$ is a fourth distance from the left hinge axis to the first mount,
 $D_2$ is the second distance, and
 $D_1$ is the first distance.

5. The apparatus of claim 1 wherein
when the left door is in a fully closed position
 a first portion of the first sheet is adjacent to the left side of the container,
 a second portion of the first sheet is adjacent to the left hinge axis, and
 a third portion of the first sheet is wound about the first roller.

6. The apparatus of claim 5 wherein
when the left door is in the fully closed position the first sheet includes a fourth portion that extends from the third portion to the second portion, wherein all of the fourth portion is located distant from the first rotor mechanism.

7. The apparatus of claim 1 further comprising
a first angle defined between
the second distance and
the first rotation arm;
wherein the first rotation limiter restricts the first angle to an orientation selected from the group consisting of an obtuse angle and a right angle.

8. The apparatus of claim 1 further comprising
a second fairing system with
a second fairing system with
a second rotor mechanism
secured to the right door, and
having a second rotation limiter configured to restrict rotation towards the right hinge axis,
a second rotation arm extending from the second rotor mechanism to a second roller,
the second roller
tensioning a second sheet secured to the right side of the container via a second mount and
wherein the first fairing system is symmetrical with the second fairing system about the centerline.

9. The apparatus of claim 8 wherein
the first roller includes a bottom with a ratcheting system for tensioning the first sheet.

10. The apparatus of claim 8 further comprising
a first C-shaped bar secured to the top and bottom of the first roller,
a second C-shaped bar secured to the top and bottom of the second roller, and
a tensioner secured to both bars and pulling the first C-shaped bar towards the second C-shaped bar.

11. The apparatus of claim 1 wherein
the first rotation arm includes
a lower bar extending from the first rotor mechanism to the bottom of the first roller, and
an upper bar extending from the first rotor mechanism to the top of the first roller; and
wherein
the lower bar,
the first roller,
the upper bar, and
the left door define an air gap opening.

12. The apparatus of claim 1 further comprising
a snag reducer secured to the left hinge,
the snag reducer offsetting the first sheet from the left hinge when the left door is in the fully closed position.

13. The apparatus of claim 1 wherein
substantially all of the left hinge is adjacent to the first sheet when the left door is in a fully closed configuration.

14. An apparatus for reducing the aerodynamic drag of a container with a right side, a left side, and a rear side having
a right door connecting to the right side via a right hinge that rotates about a right hinge axis,
a left door connecting to the left side via a left hinge that rotates about a left hinge axis, and
a centerline between the right door and the left door,
the apparatus comprising
a first fairing system with
a sheet with
a first end secured to the left side of the trailer and
a second end secured to a rotation mechanism,
the rotation mechanism including
a rotation joint secured to the left door,
a rotation arm extending from the rotation joint to the second end of the sheet,
a rotation limiter configured to restrict rotation of the rotation arm towards the left side of the trailer, and
a sheet tensioner pulling the first end of the sheet towards the second end of the sheet, wherein the sheet tensioner pulls on the sheet when the left door is a fully closed position, a fully open position, and an intermediate open position.

15. The apparatus of claim 14 further comprising
a geometric angle defined by an intersection of
the rotation arm and
a horizontal portion of the left door extending from the left hinge to the rotation joint,
wherein
the rotation limiter restricts the geometric angle to an orientation selected from the group consisting of an obtuse angle and a right angle.

16. The apparatus of claim 14 wherein
during opening rotation of the left door about the left hinge axis
the sheet tensioner is configured to retract the sheet and
the rotation arm is configured to rotate away from the left hinge axis before the rotation arm is adjacent to the left side of the container.

17. The apparatus of claim 14 wherein
when the left door has been opened 90 degrees relative to a fully closed position, the first fairing system is configured to automatically pull the left door into a fully opened position.

* * * * *